Figure 1:
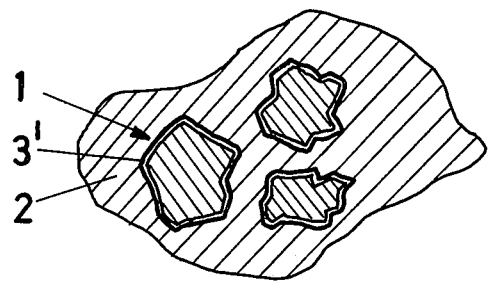

United States Patent [19]

Oberbichler

[11] 4,021,208

[45] May 3, 1977

[54] ABRASIVE ARTICLE

[75] Inventor: Werner Oberbichler, Schwaz, Austria

[73] Assignee: Tyrolit-Schleifmittelwerk Swarovski K.G., Austria

[22] Filed: May 16, 1975

[21] Appl. No.: 578,343

Related U.S. Application Data

[63] Continuation of Ser. No. 386,426, Aug. 7, 1973, abandoned.

[30] Foreign Application Priority Data

Aug. 7, 1972    Austria .............................. 6782/72

[52] U.S. Cl. .............................. 51/295; 51/298 R; 51/307

[51] Int. Cl.² .......................................... B24D 3/24

[58] Field of Search .................... 51/298, 307, 295

[56] References Cited

UNITED STATES PATENTS

| | | | |
|---|---|---|---|
| 2,745,728 | 5/1956 | Irany | 51/298 |
| 2,881,065 | 4/1959 | Reuter | 51/298 |
| 3,111,401 | 11/1963 | Cohen | 51/298 |
| 3,385,684 | 5/1968 | Voter | 51/298 |
| 3,528,789 | 9/1970 | Mathewson et al. | 51/298 |
| 3,541,739 | 11/1970 | Bryon et al. | 51/295 |
| 3,592,618 | 7/1971 | Alden | 51/298 |
| 3,632,320 | 1/1974 | Henmi | 51/298 |
| 3,661,544 | 5/1972 | Whitaker | 51/298 |

*Primary Examiner*—Donald J. Arnold
*Attorney, Agent, or Firm*—Wenderoth, Lind & Ponack

[57] ABSTRACT

An abrasive article comprising abrasive grains, bonding agents and at least partially active fillers, whereby the active filler material is located in or on the abrasive grains.

1 Claim, 5 Drawing Figures

ABRASIVE ARTICLE

This is a continuation of application Ser. No. 386,426, filed Aug. 7, 1973, now abandoned.

The invention relates to an abrasive article such as an abrasive material made of abrasive grains, an inorganic or organic bonding agent and at least one active filler.

As already known, fillers are divided into four main groups:

1. Inactive fillers (fillers in the usual sense, as used in plastics processing). Advantage: Decreased necessity for bonding agents - therefore reduction of costs.
2. Reinforcing fillers (reinforcement of glas fibers, asbestos, surface treated fine grain).
3. Fillers to reduce the strength of the bonding agents. Advantage: The abrasive character of the abrasive disk is reduced, and it becomes smoother.
4. Active fillers which, based on chemical and physical reactions, cause an increase in the service-life of the abrasive grain and lead to a "cooler abrasion". (temperatures which arise during the grinding are kept at a lower level). Advantage: The cutting surface is smoother — therefore improved surface quality.

It is already well known that active fillers are used in the production of abrasive articles. It is the function of these active fillers to prevent, through reaction, a welding of the grit to the grain, resp. to the workpiece, thus preventing the formation of built-up edges (covering of the grain with grit), protecting the abrasive grain from a reaction with the grit and thereby guaranteeing as long a service life of the abrasive grain as possible, reducing friction between the grain and the workpiece and absorbing the frictional heat, which originates in the course of the abrasive process, in the form of evaporation heat, sublimation heat and dissociation heat.

As fillers then may be used; organic and inorganic bonds which contain highly reactive (active in that they react with the workpiece material) elements, such as the elements themselves, as well as the blends of these elements and the blends with bonding agent. Elements of the 5th, 6th and 7th main group of elements of the periodic system may be used for example, as are already used in a similar form as high pressure additives for lubricants or as compact lubricants; e.g. sulfur, metallic sulfides, halides:

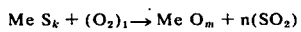

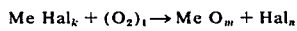

In the abrasive articles used today the fillers are always as evenly as possible distributed in the bonding by physical or chemical means. This is due to the manufacturing sequence:

1. Moistening of the abrasive article with a wetting liquid, e.g. liquid phenolic resol.
2. Combining of the pulverous bonding agent with the fillers.
3. Coating of the moistened grain with said pulverous blend (to achieve utmost fluidity of the blend).
4. Molding — pressing — burning.

Thus a large proportion of the active fillers which are evenly distributed in the whole binder are not directly active on the real cutting point, as they are in some distance from the real confluent zone of the respective abrasive grain.

Moreover the number of usable active fillers is largely restricted, as all hygroscopic substances and all substances which become liquid or volatile at the temperature which is necessary for curing, have to be eliminted thereby weakening the bond.

It is therefore the object of the present invention to create an abrasive article which on the one hand permits an optimal employment and utilization of the active fillers and on the other hand will enable one to use substances which up to now could not, or only after a special casing, be used, although they are highly effective during the abrasive process.

This object is attained according to the invention in that the active fillers or filler are placed as a whole or partially in and/or on the abrasive grain.

According to the present invention, porous abrasive grain whose pore space is completely or at least partially filled with active fillers, as well as ordinary, nonporous abrasive grains which are, according to the present invention, covered with a filler coating will be used. The extent of the filling largely depends on the manufacturing process. According to the invention the coating is exclusively or at least primarily active in the abrasive process. This is an important contrast to hitherto known grain coatings, which have exclusively been employed to influence the adhesiveness of the grain without the bond and to improve heat transfer from the grain to the bond (e.g. covering with a ceramic such as an inorganic coating which contains grains and completely or partially inert substances, such as metallic oxide).

According to the present invention the above-mentioned porous abrasive articles and the ordinary abrasive articles with a filler coating will be covered with a sealing coating, if hygroscopic, liquid or sublimating fillers are used.

Of course the combination of the above-mentioned possibilities is an object of the invention as well. Moreover adherence agents such as bonding agents which can be inserted into the filler as known per se, in order to improve the mechanical and thermal qualities of the coating. Likewise is it possible to insert a part of the active fillers into the bond as already described before.

Several embodiments of the invention will now be described with reference to the figures of the accompanying drawing without the invention being limited thereto.

FIGS. 1 to 5 are schematic inserts of an abrasive article according to the invention.

Referring to FIG. 1, the abrasive grains 1, embedded in the bonding agent 2, are surrounded by a filler coating 3' and are inserted as a whole, in the bonding agent 2.

An abrasive disk according to the invention may be composed as in the following example:

| | data in percentage by weight |
|---|---|
| Al$_2$O$_3$ normal corundum (24 mesh) | 80% |
| cryolit melted on the grain as coating | 7% |
| phenolic resin, liquid-resole (e.g. Bakelite 433) | 4% |
| phenolic resin, pulverous (Novolak hexa, e.g. Bakelite 222) | 9% |
| density of the disk - 2,45 g/cm$^3$ | |

Figure 2:
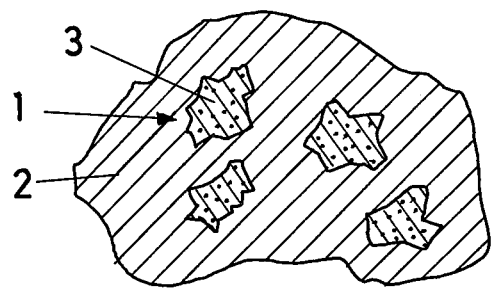

In the embodiment of the invention shown in FIG. 2 porous abrasive grain, e.g. sintered corundum, as well as smelter corundum may be used. In the embodiment, 1 the pore space of the abrasive grain 1 is almost completely soaked with the filler 3. The abrasive grains 1 together with the filler 3 are, in turn, embedded as a whole in the bonding agent 2.

The just mentioned embodiment may be composed as follows:

| | data in percentage by weight |
|---|---|
| porous corundum Al₂O₃ with approximately 20% of the pore space filled up to around 80% with elementary sulfur, mesh 24 | 87% |
| phenolic resin, liquid (Bakelite 433) | 4% |
| phenolic resin, pulverous (Bakelite 222 | 9% |
| density of the disk - 2,45 g/cm³ | |

In both of these embodiments it is possible for the to act directly on the grit surface, thus contributing to an essential prolongation of the service life of the abrasive disk and to a cooler abrasion.

Figure 3:
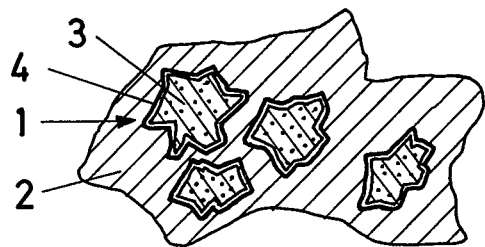

The embodiment shown in FIG. 3 may be employed if hygroscopic, sublimating or liquid fillers are used. Similar to the embodiment shown in FIG. 2, porous abrasive grains are used. The abrasive grains 1 are soaked with the filler 3, thus covering the abrasive grains with a dense, organic or inorganic coating 4. The thus coated abrasive grains are, in turn, embedded in the bonding agent 2.

According to this embodiment an abrasive article may be composed as follows:

| | data in percentage by weight |
|---|---|
| Porous corundum with around 20% of the pore space filled up to 85% with zinc chloride ZoCl₂, mesh 24 | 86,5% |
| epoxy resin, liquid resin (any kind of hardener) e.g. Aralcite AY 103+HY 956, ratio 5:1 | 0,5% |
| phenolic resin, liquid (Bakelite 433) | 4% |
| phenolic resin, pulverous (Bakelite 222) | 9% |
| density of the disk - 2,45 g/cm³ | |

Figure 4:
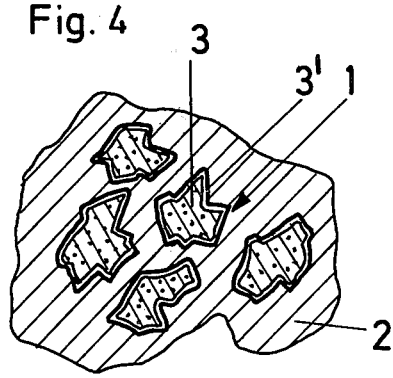

In the embodiment, shown in FIG. 4 porous corundum is used as well, the pore space being completely or partially filled with the filler 3; however the coating 3' shows filler capacity as well. It is thereby absolutely within the basic idea of the invention to use for example 2 fillers, with the pore space of the abrasive grain 1 being filled with hygroscopic fillers, whereas a filler with a sealing capacity is used as coating 3'.

According to this embodiment an abrasive disk may be composed as follows

| | data in percentage by weight |
|---|---|
| porous corundum Al₂O₃ with around 29% of | |

| | data in percentage by weight |
|---|---|
| the pore space filled up to 70% with Sodium chloride NaCl₂ | 84% |
| cryolite coating | 3% |
| phenolic resin, liquid (Bakelite 433) | 4% |
| phenolic resin, pulverous (Bakelite 222) | 9% |
| density of one disk - 2,45 g/cm³ | |

Figure 5:
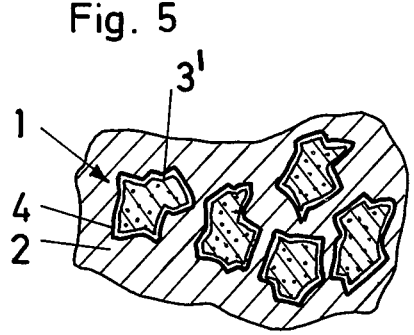

FIG. 5 shows an embodiment which, on the main, corresponds to the embodiment of FIG. 4, however, also, the outer filler coating 3' is covered with a sealing coating without filler capacity.

The data used in the various tables refers to a disk 150x 25x 20. The respective blend was pressed into a form and cured in the oven at a temperature of 180° Celsius under the usual conditions for abrasive disks bonded with phenolic resin.

The advantage of such an abrasive disk is obvious. The fillers may become active in the very place of the abrasive process, namely in the abrasive zone of the abrasive grain. A further and essential advantage resides in the possibility to use, according to the embodiments shown in FIGS. 3 to 5, hygroscopic, sublimating or liquid substances as fillers. This is a substantial extension of fillers from among which the producer could hitherto choose, thus permitting a broader choice with regard to cheaper fillers, in addition to the fact that the abrasive disk itself already implies a reduction of costs, as, in proportion to hitherto known articles, better effects may be achieved with a much smaller quantity of fillers.

Apart from economic advantages, the better utilization of the fillers implies important advantages for the environment; on the one hand fillers which hitherto have been used to a great extent and sometimes eliminate deliterious substances can now be employed in a much smaller quantity with the abrasive effect however remaining the same, on the other hand a whole range of innocuous, hitherto unusable fillers may be employed.

One of the essential advantages of the invention resides in the possibility to use it with every kind of abrasive grain. It therefore has no restrictive connotation whether corundum, zirconic corundum, carbides, as for example silicon carbide, boron carbide, nitrides, borides, diamond or the like are used for an abrasive article or abrasive material according to the present invention.

The term abrasive article should be understood in its broadest meaning, as abrasive segments and honing stones are comprehended in the basic idea of the invention.

The term abrasive material according to the invention comprehends for example abrasive power, abrasive coated paper, abrasive fillers and the like.

What I claim is:

1. In an abrasive article comprising abrasive grains, a binder and at least one active filler, the improvement wherein said active filler is substantially located in the abrasive zone of said abrasive grains, said abrasive grains being porous and the pores of said abrasive grains being filled with said active filler to at least about 20% of the pore space, said active filler being selected from the group consisting of sulfur, a metallic sulfide and a metallic halide and said abrasive being porous corundum.

* * * * *